Aug. 2, 1938.                F. GLEICH                2,125,556
                         SHEARING MACHINE
                        Filed Jan. 29, 1937
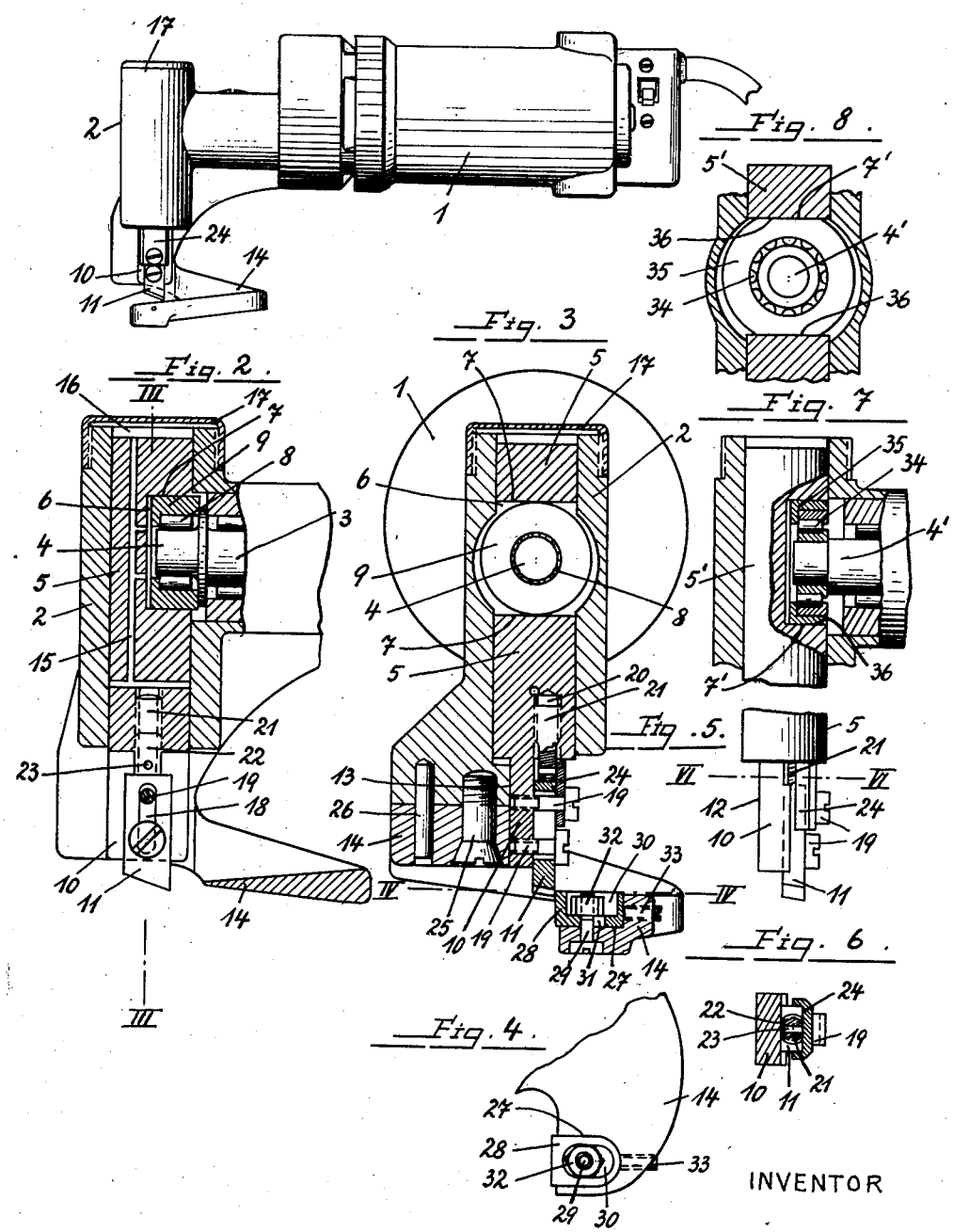
INVENTOR
FRITZ GLEICH
By Young, Emery & Thompson ATTORNEYS Patented Aug. 2, 1938

2,125,556

UNITED STATES PATENT OFFICE 2,125,556

SHEARING MACHINE

Fritz Gleich, Weil-in-the-Dorf, near Stuttgart, Germany

Application January 29, 1937, Serial No. 123,053

6 Claims. (Cl. 30—272)

The invention relates to mechanically operated shears for cutting sheets of metal, cardboard, leather and other materials, the shears being of the kind in which a reciprocating shear blade coacts with a fixed blade, the reciprocating blade being actuated by mechanism driven by a suitable motor, generally an electromotor, which may be structurally incorporated with the tool or may drive it by means of a flexible shaft.

The invention is applicable to portable machines and also to stationary machines, and is concerned with various improvements in the driving mechanism, means for fixing and adjusting the blades, and means for lubricating the parts.

An embodiment of the invention is shown in the accompanying drawing, in which

Fig. 1 is a side elevation of the tool,

Fig. 2 being a section, to a larger scale, of the actuating mechanism,

Fig. 3 a section on the line III—III of Fig. 2, and

Fig. 4 a section on the line IV—IV of Fig. 3.

Fig. 5 is a side view of a detail of the tool, and

Fig. 6 is a cross-section on the line VI—VI of Fig. 5.

Figs. 7 and 8 are sections corresponding respectively to Figs. 2 and 3 but illustrating a modification of the mechanism.

An electromotor 1 is joined to a tubular housing 2 and drives a shaft 3 having at its outer end an eccentric pin 4 located in this housing. In the housing 2 there is a cylindrical slide 5 having a lateral recess 6 with flat walls 7 at top and bottom. The eccentric pin 4 extends into this recess and has upon it a roller bearing 8 supporting a ring 9 in contact with the wall surfaces 7, so that by rotation of the shaft the slide 5 is vertically reciprocated. The slide 5 has therein ducts 15 for lubricant contained in the bore 16 in which the slide works. At the top the housing 2 is closed by a screw cap 17, and by screwing down this cap the lubricant is forced into the ducts.

At its lower end the slide 5, which is the holder of one of the shear blades, has an extension 10, which carries a shear blade 11. Rotation of the slide 5 is prevented by contact of a flat, vertical surface 12 of the extension 10 with corresponding surfaces 13 of the housing 2 and of an arm 14 fixed to the housing. The shear blade 11 has a vertical slot 18 and is fixed to the part 10 by two screws 19 passing through this slot. For readjusting the blade when it has become shortened by grinding the slide 5 has a vertical, screw threaded bore 20 into which a screw 21 is screwed. The screw has a transverse bore 23 for inserting a key for turning it, and at its lower end it has two lateral flats 22, one or other of which, after adjustment of the screw, abuts against a plate 24 placed against it and held fast by the upper screw 19 so that the screw is locked (Fig. 6).

The arm 14 is fixed to the housing 2 by screws 25 and pins 26, and is curved at its free end (Fig. 4) so as to face the blade 11, its end portion having a recess 27 forming a seat for the fixed shear blade 28, which is held in its seat by a bolt 29. The blade has a recess 30 accommodating the nut 32 on the bolt, and the shank of the bolt passes through a slot 31 in the blade, enabling the blade to be adjusted. A screw 33 in a horizontal bore in the arm 14 abuts against the blade at the rear thereof.

In the modification shown in Figs. 7 and 8 the eccentric pin, designated $4^1$, has thereon a bearing 34 supporting a ring 35 flattened at top and bottom to form two smooth faces 36 in contact with the wall surfaces $7^1$ of the recess in the slide $5^1$. In the course of the reciprocating movement of the slide the faces 36 move to and fro on the surfaces $7^1$, fairly large bearing surfaces being afforded as compared with the construction shown in Figs. 2 and 3, where only linear contact is made between the ring 9 and the surfaces 7.

The casing of the electromotor serves as a handle, current being supplied to the motor by means of a cable connected thereto.

What I claim as my invention and desire to secure by Letters Patent of the United States is:—

1. In a hand operable shearing machine the combination of a casing serving as a handle, an electromotor in said casing, a driven shaft therein, a housing attached to said casing at right angles thereto and having a cylindrical bore and having a flat guide surface parallel with the axis of said bore, a reciprocatable shear blade holder having a cylindrical part slidable in said bore and having outside said bore a flattened part in contact with said guide surface, said cylindrical part of said holder having a recess having two flat wall surfaces in planes perpendicular to the axis of said cylindrical part, and the driven shaft having at one end an eccentric pin extending into said recess, and a ring rotatably mounted on said pin in sliding contact with said flat wall surfaces of said recess.

2. In a shearing machine the combination of a reciprocatable shear blade holder, said holder having a screw threaded bore parallel with its direction of movement, a screw screwed into said bore, and having a flat lateral surface outside said bore, a shear blade outside said bore, abutting against the end of said screw outside said bore, a plate abutting against said flat lateral surface of said screw and against said blade, and screws whereby said blade is adjustably fixed to said holder, one of said blade fixing screws serving also to fix said plate to said holder.

3. The combination claimed in claim 1, the housing wherein said holder is reciprocatable being open above and a screw cap on said housing for closing the same, the said holder having ducts therein leading from its upper end to the side surfaces thereof and to the said recess.

4. The combination claimed in claim 1, together with an arm fixed to said housing, having a seat for a shear blade, and means for adjusting said shear blade on said seat transversely of the direction of movement of said holder.

5. The combination claimed in claim 1, together with an arm fixed to said housing and having a seat for a shear blade, a shear blade on said seat, having a recess and a slot, a nut and bolt parallel to the axis of said housing for fixing said blade upon said seat, said nut being located in said recess and said bolt passing through said slot, and a screw screwed into said arm transversely of the axis of said housing and extending into said recess and abutting against said blade transversely of said bolt.

6. The combination claimed in claim 1, said holder having in its cylindrical part a screw threaded bore parallel with its direction of movement, together with a screw screwed into said bore and projecting therefrom laterally of said flattened part of said holder, a slotted shear blade having one side abutting against said flattened part and abutting with its top edge against said screw, and screws passing through the slot in said blade into said flattened part of said holder, whereby said plate is held against said flattened part.

FRITZ GLEICH